United States Patent [19]

Rebhahn et al.

[11] Patent Number: 4,560,746

[45] Date of Patent: Dec. 24, 1985

[54] ULTRAFILTRATION PROCESS FOR PURIFICATION OF DYES USEFUL IN FOODSTUFFS

[75] Inventors: Robert W. J. Rebhahn, Berkley, Mass.; Wayne L. Cook, Cincinnati, Ohio

[73] Assignee: The Hilton-Davis Chemical Co., Cincinnati, Ohio

[21] Appl. No.: 677,118

[22] Filed: Nov. 30, 1984

Related U.S. Application Data

[63] Continuation-in-part of Ser. No. 481,038, Mar. 28, 1983, abandoned.

[51] Int. Cl.$^4$ ............... C09B 29/16; C09B 67/54; C09B 69/00
[52] U.S. Cl. ................. 534/840; 534/554; 534/883; 534/884; 534/887
[58] Field of Search ............... 260/208, 144 P; 534/887, 573, 840, 883, 884; 546/174

[56] References Cited

U.S. PATENT DOCUMENTS

| | | |
|---|---|---|
| 3,249,444 | 5/1966 | Bollenback et al. . |
| 3,544,455 | 12/1970 | Adams et al. . |
| 4,165,288 | 8/1979 | Teed et al. . |
| 4,189,380 | 2/1980 | Booth et al. ............... 260/144 X |

FOREIGN PATENT DOCUMENTS

| | | |
|---|---|---|
| 59782 | 9/1982 | European Pat. Off. . |
| 816730 | 10/1981 | South Africa . |

OTHER PUBLICATIONS

Colour Index, 3rd Edition, vol. 4, p. 4087, #15985, (1971).
Osmonics, Inc. Bulletin No. 109, Mar. 1978.
Spatz I, D. Dean, Reverse Osmosis/Ultrafiltration Application to Water Reuse and Material Reclamation, 5-1-75.
Spatz II, D. Dean, Industrial Wastes, Jan.–Feb. 1974, pp. 20–24.

Primary Examiner—Floyd D. Higel
Attorney, Agent, or Firm—William G. Webb; B. Woodrow Wyatt; Paul E. Dupont

[57] ABSTRACT

The disodium salt of 1-[(6-methoxy-4-sulfo-3-methylphenyl)azo]-2-naphthol-6-sulfonic acid (FD and C Red 40), the disodium salt of 1-[(4-sulfophenyl)azo]-2-naphthol-6-sulfonic acid (FD and C Yellow 6), the trisodium salt of 1-[1-(4-sulfonaphthyl)azo]-2-naphthol-3,6-disulfonic acid (FD and C Red 2), the disodium salt of 2-[1-(4-sulfonaphthyl)azo]-1-naphthol-4-sulfonic acid (Carmoisine) and the sodium salt of 2-(2-quinolyl)-1,3-indanedione-sulfonic acid (D and C Yellow 10) are prepared and purified in high yield and in a high state of purity by subjecting their aqueous reaction mixtures to ultrafiltration through a membrane of such structure and under such conditions that the impurities are separated from the reaction mixtures, and the products are concentrated in high purity concentrates from which the products can be isolated directly by evaporation of the solvent.

17 Claims, No Drawings

4,560,746

ULTRAFILTRATION PROCESS FOR PURIFICATION OF DYES USEFUL IN FOODSTUFFS

RELATED APPLICATION

This is a continuation-in-part of our prior, copending application Ser. No. 481,038, filed Mar. 28, 1983, now abandoned.

BACKGROUND OF THE INVENTION (a) Field of the Invention

This invention relates to the field of purification, by ultrafiltration techniques, of dyes useful in foodstuffs.

(b) Information Disclosure Statement

Bollenback et al. U.S. Pat. No. 3,249,444, patented May 3, 1966, describes an ultrafiltration process for increasing the tinctorial power of caramel color in which sugar, i.e. uncaramelized sugar, is separated from caramel color by ultrafiltration through a semi-permeable membrane which permits passage of small, uncolored molecules in solutions containing caramel color and rejects the passage of larger, polymeric caramel color molecules, thus enhancing the color of the concentrate. Preferred membranes for the process are made of vinyl plastics, and preferred pressures are in the range from 20 to 100 p.s.i.g.

Adams et al. U.S. Pat. No. 3,544,455, patented Dec. 1, 1970, discloses a process for the purification of itaconic acid by reverse osmosis through a semi-permeable membrane composed of cellulose acetate or polyamide in which itaconic acid and water are forced to the downstream side of the membrane, while inorganic salts, colored materials and organic materials remain on the upstream side. The process is carried out under a hydrostatic pressure of from 100 to 1,000 p.s.i.g. and at a pH in the range from 2 to 4.

Teed et al. U.S. Pat. No. 4,165,288, patented Aug. 21, 1979, discloses a process for the concentration and partial purification of textile vat dyes for recovery and reuse of the same by subjecting the dye solutions from dyeing operations to reverse osmosis through a semi-permeable membrane, impurities being collected in the permeate and the dye being concentrated in the concentrate. The process is carried out at hydrostatic pressures from 400 to 1,300 p.s.i.g. and at temperatures from 130° F. to 212° F. In order to prevent plugging of the membrane, a turbulent flow of liquid is needed.

EPO Application No. 59,782, published Sept. 15, 1982, discloses a process for concentration, to unspecified levels of purity, of certain anionic dyes, useful in the printing and dyeing of synthetic fibre materials, by passing solutions or suspensions of the dyes through a semi-permeable membrane with a pore diameter of 1–500 Angstroms.

South African Pat. No. 81/6,730, patented Sept. 6, 1982 discloses a process for the preparation of concentrated solutions of anionic dyes, of unspecified purity and useful in printing inks and dye baths, comprising passing a suspension or solution of the dye over a semi-permeable membrane containing ionic groups and having a pore diameter of 1–500 Angstroms.

Osmonics, Inc. Bulletin No. 109 describes the use of a variety of reverse osmosis/ultrafiltration membranes for a variety of purposes, including use of Osmonics, Inc. SEPA-50 membrane in textile dye removal. The membrane is said to give 40–70% sodium chloride rejection and a molecular weight cut-off of approximately 600 for organic materials.

Spatz, Reverse Osmosis/Ultrafiltration Application to Water Reuse and Material Reclamation, May 1, 1975, at page 8, discloses that reverse osmosis/ultrafiltration membranes can be used to remove organic dyes and that some organic dyes are poorly rejected by the membrane. That is, the dye would pass through the membrane.

Spatz, Industrial Wastes, January/February 1974, pages 20–24, discloses the use of reverse osmosis/ultrafiltration membrane methods for concentrating sucrose/dye solutions used in Maraschino cherry processing so that used dyeing solutions, rather than being discarded as in the past, can be concentrated down and reused.

Thus although the general concept of the use of reverse osmosis/ultrafiltration techniques to purify and concentrate a variety of materials is known, so far as is known, the application of this technology to dyes has been restricted to its use for merely concentrating dyes for reuse either in the textile industry, as in Teed or EPO Application No. 59,782, or in Maraschino cherry dyeing, as in Spatz (Industrial Wastes).

SUMMARY

In accordance with the present invention, certain dyes useful in foodstuffs are not merely concentrated, as provided by the prior art, but rather are prepared in molar yields which are unprecedented in the food dyestuff industry, and at purity levels which exceed the purity standards required by the U.S. Food and Drug Administration.

These unprecedented results are achieved by essentially incorporating the purification of the dyes as part of a continuous preparation/purification process, the purification being effected by subjecting an aqueous solution of the reaction mixture resulting from preparation of the dye to ultrafiltration under conditions such that the dye can be isolated by evaporation of its solution in molar yields of approximately 98% and in a state of purity of approximately 90%. In certain instances molar yields as low as around 75% are obtained, but even in such cases, the state of purity of the dyes which can be achieved by the present process is around 90%. In practicing the invention, it is preferred to subject the reaction mixture, which results from the preparation of the dyes, directly to ultrafiltration without isolation of the product. Alternatively, however, the products can be isolated in crude form from the reaction mixtures, either by salting out or by spray drying, and the crude product then redissolved in water and the solution subjected to ultrafiltration.

Accordingly, the invention comprises a process for purification of a dye selected from the group consisting of the disodium salt of 1-[(6-methoxy-4-sulfo-3-methylphenyl)azo]-2-naphthol-6-sulfonic acid, the disodium salt of 1-[(4-sulfophenyl)azo]-2-naphthol-6-sulfonic acid, the trisodium salt of 1-[1-(4-sulfonaphthyl)azo]-2-naphthol-3,6-disulfonic acid, the disodium salt of 2-[1-(4-sulfonaphthyl)azo]-1-naphthol-4-sulfonic acid and the sodium salt of 2-(2-quinolyl)-1,3-indanedione-sulfonic acid as the products of their respective preparations via coupling of diazonium salts, in the case of the first four named dyes, and via sulfonation, in the case of the last named dye, where said dyes are present in the final reaction mixtures along with impurities, which process comprises subjecting an aqueous solution of the reaction mixture resulting from said coupling or said sulfonation to ultrafiltration through a membrane having a nominal pore diameter of from 5 to 15 Angstroms under a hydrostatic pressure of approximately 200 to 400 p.s.i.g. to thereby cause separation of the impurities into the permeate and concentration of the products in the concentrate.

DETAILED DESCRIPTION INCLUSIVE OF THE PREFERRED EMBODIMENTS

The dyestuffs, FD and C Red 40 and FD and C Yellow 6, chemically the disodium salt of 1-[(6-methoxy-4-sulfo-3-methylphenyl)azo]-2-naphthol-6-sulfonic acid and the disodium salt of 1-[(4-sulfophenyl)azo]-2-naphthol-6-sulfonic acid, respectively, are approved by the U.S. Food and Drug Administration, and Amaranth and Carmoisine, chemically the trisodium salt of 1-[1-(4-sulfonaphthyl)azo]-2-naphthol-3,6-disulfonic acid and the disodium salt of 2-[1-(4-sulfonaphthyl)azo]-1-naphthol-4-sulfonic acid, respectively, are approved by the European Economic Community (E.E.C.), for use in foodstuffs, but as foodstuff additives, they must meet certain strict standards of purity. FD and C Red 40, FD and C Yellow 6, FD and C Red 2 and Carmoisine are each prepared in essentially "one pot" reactions by the diazotization of 5-methoxy-2-methylsulfanilic acid (FD and C Red 40), sulfanilic acid (FD and C Yellow 6), and sodium 4-amino-1-naphthalene sulfonate (FD and C Red 2 and Carmoisine), followed by coupling of the resulting respective diazonium salts with sodium 2-naphthol-6-sulfonate, for the preparation of FD and C Red 40 and FD and C Yellow 6, or with disodium 2-naphthol-3,6-disulfonate, for the preparation of FD and C Red 2, or with sodium 1-naphthol-4-sulfonate, for the preparation of Carmoisine. Moreover D and C Yellow 10, chemically the sodium salt of 2-(2-quinolyl)-1,3-indanedione sulfonic acid, is approved for use as a drug and cosmetic coloring agent. D and C Yellow 10 is also prepared in an essentially "one pot" procedure involving condensation of 2-quinaldine with phthalic anhydride followed by sulfonation of the resulting 2-(2-quinolyl)-1,3-indanedione.

Dyestuffs which are not intended for human consumption, for example those intended for use as textile dyes or printing inks, whose state of purity for such ultimate uses is not critical, can, of course, be isolated directly by evaporative concentration of the reaction mixtures in which they are produced followed by collection of the dye. Using such procedures, the final products are contaminated with major amounts of impurities whose presence would not adversely affect the use of the dyes. However, in dyes used as food coloring agents, for example, such product isolation procedures in which large amounts of impurities would be carried along with the product, would be completely unacceptable.

Therefore dyestuffs used as food coloring agents have conventionally been separated from impurities present in their reaction mixtures by crystallization. However, because the various dyes which are the subject of this invention are all moderately soluble in water, they have heretofore been purified of impurities present in reaction mixtures in which they are produced by the addition of large quantities of salt (sodium chloride) so as to "salt out" the product. However such salting out processes have several disadvantages. To begin with, the salt required is expensive, and furthermore the brine produced in the final filtrate presents a major disposal problem for industry. Moreover, because of the high solubility of the dyes, even in brine, a high percentage of the product (from around 12% to around 20%) is lost in the brine. Thus in a typical batch containing 2,500 pounds of FD and C Red 40 in a final reaction mixture, 13,200 pounds of salt would be required in order to recover about 2,200 pounds of product, the remaining 300 pounds being lost in the filtrate after collection of the solid product by filtration.

It will be seen then that, in view of the above circumstances, the cost of the salt, the added cost to industry of disposing of the brine and the cost of the lost product can, in toto, be very substantial, resulting in greatly increased costs of the products as sold. The novel method provided by the present process overcomes these disadvantages by avoiding the need for salt and by providing for recovery of up to 98% of the product actually produced in the reaction mixture. In addition, the method produces a product having a state of purity which exceeds the purity standards required by regulatory agencies, such as the U.S. Food and Drug Administration, or by the European Economic Community.

In accordance with the present invention for the purification of FD and C Red 40, FD and C Yellow 6, FD and C Red 2 and Carmoisine, all prepared by coupling of an appropriate diazonium salt with a naphthol sulfonic acid derivative, therefore, these advantages are realized by incorporating the purification step as part of an essentially continuous preparation/purification procedure in which the reaction mixtures resulting from the coupling of the diazonium salts of 5-methoxy-2-methylsulfanilic acid (for FD and C Red 40), sulfanilic acid (for FD and C Yellow 6) or 4-amino-1-naphthalene sulfonic acid (for FD and C Red 2 and Carmoisine), in the form of the corresponding sodium salts in each case, with sodium 2-naphthol-6-sulfonate, disodium 2-naphthol-3,6-disulfonate or sodium 1-naphthol-4-sulfonate, as the case may be, are subjected directly to ultrafiltration through a membrane having a nominal pore diameter of such limiting size that the membrane will reject all molecules of a molecular size either the same as or greater than the products, FD and C Red 40, FD and C Yellow 6, FD and C Red 2 or Carmoisine, but which will allow passage of smaller molecules, including unreacted starting materials, i.e. 5-methoxy-2methylsulfanilic acid (also known as cresidine sulfonic acid and hereinafter designated CSA), as used in the preparation of FD and C Red 40, sulfanilic acid (hereinafter designated SA), as used in the preparation of FD and C Yellow 6, 4amino-1-naphthalene sulfonic acid, as used in the preparation of FD and C Red 2 and Carmoisine, sodium 2-naphthol-6-sulfonate (also known as Schaeffer's salt and hereinafter designated SS), disodium 2-naphthol-3,6-disulfonate and sodium 1-naphthol-4-sulfonate, as well as sodium chloride, which are the principal impurities to be found in the various aqueous product mixtures.

The reaction mixtures, however, may also contain impurities resulting from preparation of the 5methoxy-2-methylsulfanilic acid (used in the preparation of FD and C Red 40), sulfanilic acid (used in the preparation of FD and C Yellow 6) or 1-aminonaphthalene-4sulfonic acid by sulfonation of the respective 5-methoxy-2-methylaniline, aniline or 1-aminonaphthalene. These latter impurities include higher sulfonates of 5-methoxy-3-methylaniline, aniline and 1-aminonaphthalene (hereinafter designated HS) and sodium sulfate.

In the case of D and C Yellow 10, the principal impurities which may be found in the final product are the intermediate 2-(2-quinolyl)-1,3-indanedione, also known as Yellow 11, the disodium salt of 2-(2-quinolyl)-1,3-indanedione disulfonic acid, which results from disulfonation of Yellow 11, unreacted quinaldine, phthalic anhydride, an impurity of unknown structure designated chlorinated Yellow 11, which is produced during the high temperature, zinc chloride catalyzed condensation of 2-quinaldine and phthalic acid, and the chlorides and sulfates of sodium.

Moreover, the reaction mixtures may, in addition, contain in minor amount a variety of other impurities formed as undesired by-products, either in the preparation of FD and C Red 40 and FD and C Yellow 6, or in the preparation of starting materials used in their preparation. Thus the diazonium salt formed from 5-methoxy-3-methylsulfanilic acid can react with the amino nitrogen atom of undiazotized 5-methoxy-3-methylsulfanilic acid, in the preparation of FD and C Red 40, to form a triazene, which, in the form of the disodium salt, has the structure:

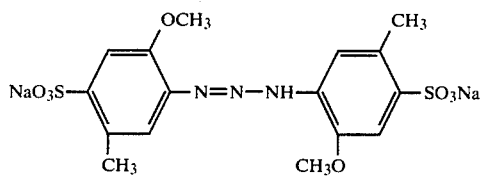

and is identified as the disodium salt of 4,4'-(diazoamino)-bis-(5-methoxy-2-methylbenzenesulfonic acid) (hereinafter designated DMMA); or the same type of triazene:

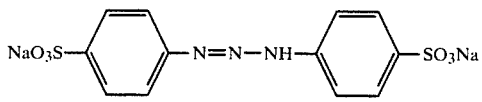

identified as the disodium salt of 4,4'-(diazoamino)-bis-(benzenesulfonic acid) (hereinafter designated DAAB) can be formed in the preparation of FD and C Yellow 6; or a dinaphthyl ether:

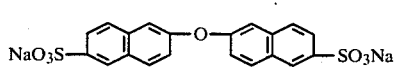

identified as the disodium salt of 6,6'-oxybis-(2-naphthalenesulfonic acid) (hereinafter designated DONS) can be produced as a by-product in the preparation of sodium 2-naphthol-6-sulfonate by sulfonation of 2-naphthol.

Thus it will be seen that the reaction mixtures resulting from the preparation of the various dyes purified in accordance with the invention can possibly contain in minor amounts, along with the desired products, a complex mixture of impurities. The economical separation of the wide variety of impurities from the products in the present process, in order to achieve the levels of purity required by FDA regulations, is thus a critical aspect of the preparation of these dyestuffs for commerce.

The presence of some of those impurities in the final products can, of course, be minimized by use of purified starting materials so that impurities from that source are not carried along in the synthetic process to the final product mixture. It will be appreciated from the foregoing that large molecular size impurities, which will be retained by the membranes, cannot be present in the solution to be purified by the present process at concentrations which would be unacceptable in the final product, because they would be rejected by the membranes, along with the desired product, and not separable therefrom by the present process.

The membranes used in the practice of the present process, and generally referred to as reverse osmosis-/ultrafiltration membranes, have a nominal pore diameter of 5-15 Angstroms, a preferred range being from 7-11 Angstroms. Membranes useful in the practice of the present invention are manufactured by Osmonics Inc. of Minnetonka, Minn. or by the Celanese Corporation and are generally formulated of cellulose acetate, polyamide or polyvinylfluoride. The filtration is carried out under a hydrostatic pressure of approximately 200 to 400 p.s.i.g. applied to the upstream side of the membrane. By use of a membrane having the appropriate critical pore size, those impurities of a molecular size smaller than the nominal pore diameter of the membrane, along with a large quantity of water, are thus forced through the membrane and accumulate on the downstream side as the permeate, while the desired product molecules, as well as impurities of a molecular size larger than the nominal pore diameter of the membrane, are rejected by the membrane and remain on the upstream side thereof where the product becomes more and more concentrated as more and more water and impurities are forced to the downstream side.

As indicated above, although the membranes used in the present process are referred to generically as reverse osmosis/ultrafiltration membranes, the term "reverse osmosis" generally refers to membranes which reject all solute particles, including ions, and will pass only water molecules, while the term "ultrafiltration" generally refers to membranes which will reject only solute particles above a certain molecular size and will pass smaller particles. (See, for example, Lacey, Chemical Engineering, Sept. 4, 1982, page 5). In the context of the present invention, therefore, the term "ultrafiltration" is considered more appropriate than the term "reverse osmosis" and accordingly is used to describe the invention.

In the preferred practice of the present process, the reaction mixture resulting from the last step in the synthetic procedure, i.e. the diazonium coupling reaction in the preparation of FD and C Red 40, FD and C Yellow 6, FD and C Red 2 or Carmoisine or the sulfonation reaction in the preparation of D and C Yellow 10, is passed to a holding tank and optionally filtered, to remove any insoluble material, before being fed to an ultrafiltration unit where, under a pressure of approximately 200 to 400 p.s.i.g., supplied by a high pressure centrifugal pump, the impurities are forced through the membrane into the permeate which can be collected for analysis or passed directly to waste lines for disposal. Alternatively the crude product previously isolated, by salting out or spray drying, can be redissolved in water and the resulting solution treated as just described.

In one embodiment contemplated by the invention, the solution from the holding tank is fed continuously to the ultrafiltration unit, while solution from the upstream side of the membrane is recirculated back to the tank. Thus ultrafiltration is carried out continuously, the concentrate in the tank being continually depleted of impurities, and water is added to the concentrate (to replace that removed in the permeate with the impurities) at such a rate as to maintain the concentration of the product in the concentrate at approximately 5% (w/w). This procedure is referred to hereinafter as diafiltration.

In another embodiment contemplated by the invention, the concentrate from the upstream side of the membrane is recirculated back to the holding tank to be replaced by additional solution fed from the tank. However, instead of replacing the water lost from the system into the permeate as in the diafiltration method, the product is allowed to concentrate in the holding tank, the extent of such concentration, of course, not being allowed to proceed to the point where crystallization of the product would occur. In such instance, additional water is added to insure complete solution of the product at all times so as to obviate plugging of the membrane pores by the crystalline material. Typically the concentration of the product in the concentrate is maintained between approximately 5% and 25% (w/w).

In both of the above-described embodiments, the progressive removal of impurities is followed by sampling the permeate from time to time, and filtration is terminated when essentially no further impurities can be detected in the permeate and, in the case of FD and C Red 40, FD and C Yellow 6, FD and C Red 2 and Carmoisine, when, in addition, the level of sodium naphtholsulfonates, in the concentrate is determined (by appropriate analytical methods such as HPLC, TLC, etc.) to be less than 0.3% of the pure color content. The essential absence of impurities in the permeate can be determined in a variety of ways, such as by determining its electrical conductance. In that method, the conductance of the permeate gradually drops during ultrafiltration because of the continuous removal of ionic species from the concentrate. When the conductance of the permeate drops from an initial level of approximately 50,000 micromhos to approximately 1,000 micromhos, and when the level of sodium naphtholsulfonates in the concentrate reaches the desired level, as indicated above, the removal of essentially all impurities can be considered complete. When that point is reached, the concentrate, containing the highly purified product in water, is evaporated to dryness by any of a number of conventional means, for example, by pan drying or spray drying, in order to isolate the product. In this manner, one can obtain molar yields up to 98% in the process. In contrast, for example, yields of only around 77% of the total available pure color (for FD and C Yellow 6) and 86% of the total available pure color (for FD and C Red 40) are obtainable using the salting out method of isolation.

In carrying out the present process the reaction mixture, as produced in the diazo coupling and as fed to the ultrafiltration unit, generally has a pH of approximately 9.0. While these solutions can be subjected successfully to ultrafiltration, it is preferred to adjust the pH to approximately 6.0 to 8.0 before passage through the ultrafiltration membrane.

The ultrafiltration process is preferably carried out at ambient temperature but can be carried out at temperatures up to around 40° C.

In order to further describe the invention and the unique advantages afforded thereby, the following examples are included by way of illustration in order to contrast the preparation and purification of FD and C Red 40 and FD and C Yellow 6, in accordance with the present invention, with the preparation and purification of the same by conventional methods. The preparation and purification of FD and C Red 2, Carmoisine and D and C Yellow 10, in accordance with the process of the invention further illustrate the same.

EXAMPLE 1

Preparation and Purification of FD and C Red 40 by the Method of the Invention

Diazotization

To a rubber lined 1,500 gallon tank was added 3,550 pounds of water and 1,085 pounds of 5-methoxy-2-methylsulfanilic acid, and the pH of the solution was adjusted to 6.0 to 8.0 by the addition of about 550 pounds of 50% sodium hydroxide. The mixture was stirred, and when all material had dissolved, the solution was treated with 350 pounds of sodium nitrite, stirring until all material had dissolved, and was then cooled to 25°-30° C. by the addition of ice.

To a separate rubber lined 3,000 gallon tank was added 2,300 pounds of water, followed by 1,510 pounds of 20° Bé hydrochloric acid and 2,000 pounds of ice, and the solution was cooled to −5° C. to 0° C. The solution from the 1,500 gallon tank was then pumped slowly into the 3,000 gallon tank while checking the pH frequently in order to maintain acid conditions (blue to Congo Red) and checking frequently for excess nitrite with starch/iodide paper in order to insure that excess nitrite is present during the diazotization. (When all the solution from the first tank has been added, the test for nitrite should be positive, and if necessary an additional 1 to 2 pounds of sodium nitrite is added to give a positive test for nitrite.) The reaction mixture was stirred at 0°-5° C. for about one to one and a quarter hours, while maintaining a slight excess of nitrite ion.

Preparation of SS Solution

To another rubber lined 6,500 gallon tank were added 8,000 pounds of water, 1,000 pounds of sodium carbonate and 1,255 pounds of sodium 2-naphthol-6-sulfonate. The resulting slurry was agitated until uniform and saved for coupling.

Coupling Reaction

The diazotized solution from the 3,000 gallon tank, at 0°-5° C., was then slowly pumped into the 6,500 gallon tank at 20°-25° C. over a one half to one hour period, while testing frequently for excess diazo compound against alkaline H-Acid solution (8-amino-1-naphthol-3,6-disulfonic acid), and if excess diazo compound was detected, the rate of addition of the diazo solution was adjusted to give a continuous negative test. The solution was also tested from time to time to insure a continued excess of sodium 2-naphthol-6-sulfonate against Diazo Blue B solution (2,2'-dimethyl-4,4'-bis diazo-biphenyl dichloride), and to insure that the pH of the solution remains alkaline. (When all the diazo solution has been added, the temperature should be 20°-25° C., the test for diazo compound should be negative, the test for sodium 2-naphthol-6-sulfonate should be positive, and the pH should be 8.3 to 8.8.)

The solution was then stirred for an additional half hour, the pH was adjusted to 6.5 to 6.7 by the addition of 20° Bé hydrochloric acid and treated with 50 pounds of DICALITE ® brand of diatomaceous earth and 180 pounds of DARCO ® S51 brand of decolorizing charcoal. The solution was then heated and stirred at 70°-75° C. for a half hour and then filtered. The filter was washed with about 4,500 pounds of water, and the combined filtrate was adjusted to pH 6.0 to 8.0 by addition of hydrochloric acid and was then led to a holding tank. From that solution was taken a 12 gallon aliquot amounting to 0.2% of the total product, together with impurities which was fed through a high pressure centrifugal pump to an ultrafiltration unit equipped with a cellulose acetate membrane having a nominal pore diameter of 11 Angstroms and under a hydrostatic pressure of 200-400 p.s.i.g. and subjected to diafiltration. That is, the concentrate was recycled back to the holding tank where the concentration of the product was maintained at around 5% by the addition of water. The permeate was collected separately and tested from time to time for its conductance, and the concentrate was tested from time to time for the total amount of SS relative to the total color. After a total of five cycles (of the product solution to the ultrafiltration unit and back to the holding tank), when the conductance had dropped to around 1,000 micromhos, and the amount of SS in the concentrate was less than 0.3% of the pure color content, ultrafiltration was interrupted. During the filtration the total pure color that passed through the membrane was determined, by either spectrometric methods or by visual comparison with known color standards, to constitute about 2% of the total available color in the original unfiltered solution from the reaction mixture thus leaving 98% of the total available pure color in the concentrate. The ultrafiltration process as described above afforded 2 gallons of purified concentrate. From this concentrate was taken a further 600 ml. aliquot which was spray dried to give 150 g. of purified product which, on assay, had the following specifications, the range of specifications required by regulations of the Food and Drug Administration being included for purposes of comparison. Here, and in all tables which follow, unless noted otherwise, all values are given in percent.

|  | Found | FDA Spec. |
|---|---|---|
| Pure Color | 91.9 | 85 |
| NaCl | 0.03 ⎫ |  |
| Na2SO4 | 0.56 ⎬ | 14* |
| Volatiles | 6.14 ⎭ |  |
| CSA | <0.02 | 0.2 |
| SS | 0.01 | 0.3 |
| DMMA | <0.02 | 0.1 |
| HS | <0.3 | 1.0 |
| DONS | <0.05 | 1.0 |

*The FDA specifications require that the total amount of NaCl, Na2SO4 and volatiles be not more than 14%. In each of the assays reported herein, separate values for each of these entities were determined and are recorded. The totals, in each case, will be seen to be within the required limits.

Two further samples of FD and C Red 40, prepared as described above, were purified by diafiltration using the procedure described above except that in one run a polyamide membrane having a nominal pore diameter of 7-10 Angstroms (Zero PA membrane obtained from the Celanese Corporation) was used and in a second run a polyvinylfluoride membrane having a nominal pore diameter of 10 Angstroms (20 VF membrane from Osmonics, Inc.) was used, to give 97% recovery of product in each case. The samples so purified had the following specifications, the ranges of specifications required by FDA regulations being given again for comparative purposes.

|  | Found | | FDA Spec. |
|---|---|---|---|
|  | Zero PA | 20 VF |  |
| Pure Color | 88.4 | 89.3 | 85 |
| NaCl | 0.05 ⎫ | 0.06 ⎫ |  |
| Na2SO4 | 0.78 ⎬ | 0.67 ⎬ | 14 |
| Volatiles | 9.22 ⎭ | 9.41 ⎭ |  |
| CSA | <0.02 | <0.02 | 0.2 |
| SS | 0.03 | <0.02 | 0.3 |
| DMMA | 0.16 | <0.02 | 0.1 |
| HS | 0.3 | 0.3 | 1.0 |
| DONS | <0.05 | <0.05 | 1.0 |

Preparation and Purification of FD and C Red 40 by the Prior Method

The above procedure was repeated through the filtration of the solution from the coupling reaction and the washing of the filter with 4,500 pounds of water. The combined filtrate was transferred to a 7,000 gallon stainless steel crystallization tank. To the tank was added 9,000 pounds of salt (equivalent to 18% of the solution volume) over a period of one half to one hour and while maintaining the temperature at about 65° C.

The crystalline material which separated was collected by filtration, and the solid was washed on the filter sequentially with 1,200 gallons each of 18° Be and 12° Be brine at 0° C. to 5° C. The filter was given a final wash with a solution of 750 gallons of water and 450 gallons of ethyl alcohol, and the product was collected and dried. There was thus obtained 2,170 pounds (87.5% yield based on 5-methoxy-2-methylsulfanilic acid) of the disodium salt of 1-[(6-methoxy-4-sulfo-3-methylphenyl)azo]-2-naphthol-6-sulfonic acid.

The material so-obtained in a series of similar runs was assayed in each case, in accordance with Food and Drug Administration regulations, and found to have the following ranges of specifications, the specifications obtained with material purified in accordance with the process of the invention as described above and specifications required by regulations of the Food and Drug Administration being given for purposes of comparison.

|  | Found (%) | Claimed Process | FDA Spec. (%) |
|---|---|---|---|
| Pure Color | 88-92 | 91.9 | 85 |
| NaCl | 2.0-3.5 ⎫ | 0.03 ⎫ |  |
| Na2SO4 | 0.05-0.1 ⎬ | 0.56 ⎬ | 14 |
| Volatiles | 3.3-7.0 ⎭ | 6.14 ⎭ |  |
| CSA | 0.02 | <0.02 | 0.2 |
| SS | 0.02-0.2 | 0.01 | 0.3 |
| DMMA | 0.02 | <0.02 | 0.1 |
| HS | 0.2-1.0 | <0.05 | 1.0 |
| DONS | 0.1-0.2 | <0.05 | 1.0 |

EXAMPLE 2

Preparation and Purification of FD and C Yellow 6 by the Method of the Invention Diazotization To a rubber lined 1,500 gallon tank was added 2,000 pounds of water followed by 1,038 pounds of sulfanilic acid and 490 pounds of sodium hydroxide, and the mixture was heated to 45° C. and stirred until all material dissolved. Additional sodium hydroxide was added as necessary to make the solution alkaline to Brilliant Yellow.

To the resulting solution was added, slowly and with stirring, 1,800 pounds of 20° Bé hydrochloric acid. When addition was complete, the mixture, which consisted of a slurry of sulfanilic acid in the liquid phase, was tested for acidity to Congo Red, and additional hydrochloric acid added as necessary to adjust the pH accordingly. The mixture was then cooled to 0° C. by addition of ice (about 3,000 pounds), and the solution was treated slowly, over a five to ten minute period, with a solution of 420 pounds of sodium nitrite in 1,000 pounds of water, while maintaining the temperature at 10°-12° C., the solution being added at such rate that no nitrous oxide was given off from the mixture. (When addition of the sodium nitrite is complete, the mixture should be positive to nitrite, and if not an additional 1 to 2 pounds of sodium nitrite are added to insure a slight excess.)

Preparation of SS Solution

In a separate rubber lined 6,500 gallon tank containing 5,000 pounds of water was added 1,480 pounds of sodium 2-naphthol-6-sulfonate, and the mixture was stirred until a smooth slurry was obtained. The pH was adjusted to 9.3 to 9.5 with 50% sodium hydroxide and then cooled, if necessary, to 20°-25° C. with ice.

Coupling Reaction

The diazo solution from the first tank, at 0°-5° C., was then pumped into the second tank over about a half hour period while maintaining the pH at 8.5 to 9.0 by addition of 50% sodium hydroxide, testing frequently for excess diazo compound with alkaline H-Acid. If excess diazo compound was detected, the rate of addition of the diazo solution was adjusted to give a continuous negative test. The solution was also tested from time to time for excess sodium 2-naphthol-6-sulfonic acid against Diazo Blue B solution in order to insure the continuous presence of an excess thereof. (When all the diazo solution has been added, the temperature should be 20°-25° C., the test for excess diazo compound should be negative, the test for sodium 2-naphthol-6-sulfonate should be positive, and the pH should be 8.4 to 9.0.)

The solution was then stirred for an additional half hour, the pH was adjusted to 6.5 to 6.7 by the addition of 20° Bé hydrochloric acid and treated with 50 pounds of DICALITE ® and 180 pounds of DARCO ® S51. The solution was then heated and stirred at 70°-75° C. for a half hour and filtered. The filter was washed with about 4,500 pounds of water, and the combined filtrate was adjusted to pH 6.0 to 8.0 by addition of hydrochloric acid and was then led to a holding tank. From that solution was taken a 9 gallon aliquot, amount to 0.2% of the total product together with impurities, which was then fed through a high pressure centrifugal pump to an ultrafiltration unit equipped with a cellulose acetate membrane having a nominal pore diameter of 11 Angstroms and, under a hydrostatic pressure of 200-400 p.s.i.g., the concentrate being recycled back to the holding tank where the concentration of the product was maintained at approximately 5% by addition of water. The permeate was collected separately and tested from time to time for its conductance, and the concentrate was tested from time to time for the total amount of SS relative to the total color. After a total of five cycles (of the product solution to the ultrafiltration unit and back to the holding tank), when the conductance of the permeate had dropped to around 1,000 micromhos, and the amount of SS in the concentrate was less than 0.3% of the pure color content, diafiltration was interrupted. During the filtration the total pure color that passed through the membrane was determined, by either spectrometric methods or by visual comparison with known color standards, to constitute approximately 5% of the total available color in the original unfiltered solution from the reaction mixture thus leaving 95% of the total available pure color in the concentrate. The ultrafiltration process as described above afforded 4.5 gallons of purified concentrate. From this concentrate was taken a further 800 ml. aliquot which was spray dried to give 54 g. of purified product which, on assay, had the following specifications, the range of specifications required by regulations of the Food and Drug Administration being included for purposes of comparison.

|            | Found  | FDA Spec. |
|------------|--------|-----------|
| Pure Color | 92.2   | 85        |
| NaCl       | 0.26   |           |
| $Na_2SO_4$ | 2.80   | 14        |
| Volatiles  | 4.89   |           |
| SA         | 0.02   | 0.2       |
| SS         | 0.1    | 0.3       |
| DAAB       | 0.02   | 0.1       |
| DONS       | <0.2   | 1.0       |

Preparation and Purification of FD and C Yellow 6 by the Prior Method

The above procedure was repeated through the filtration of the solution from the coupling reaction and the washing of the filter with 4,500 pounds of water. The combined filtrate was transferred to a 7,000 gallon stainless steel crystallization tank. To the tank was added, over a period of a half hour at 70° C., an amount of sodium chloride equivalent to about 17% of the total volume (8,000-9,000 pounds).

The crystalline material which separated was collected by filtration, and the solid was washed on the filter with 1,200 gallons of 18° Bé brine, then four times with 2° Bé brine at 0°-2° C. (1,200 gallons per wash), three more times with 18° Bé brine (1,200 gallons per wash) and finally two times with 1,200 gallons of water at 0° C. and then dried. There was thus obtained 2,100 pounds of the disodium salt of 1-[(4-sulfophenyl)azo]-2-naphthol-6-sulfonic acid (77% yield based on sodium 2-naphthol-6-sulfonate).

The material so-obtained in a series of similar runs was assayed in each case, in accordance with Food and Drug Administration regulations, and found to have the following range of specifications, the specifications obtained with material purified in accordance with the process of the invention as described above and specifications required by regulations of the Food and Drug Administration being given also for purposes of comparison.

|            | Found     | Claimed Process | FDA Spec. |
|------------|-----------|-----------------|-----------|
| Pure Color | 89-92     | 92.2            | 85        |
| NaCl       | 3.9-5.0   | 0.26            |           |
| $Na_2SO_4$ | <0.05     | 2.80            | 14        |
| Volatiles  | 1.7-5.4   | 4.89            |           |
| SA         | 0.02      | 0.02            | 0.2       |
| SS         | 0.04-0.08 | 0.1             | 0.3       |
| DAAB       | 0.02      | 0.02            | 0.1       |

-continued

| | Found | Claimed Process | FDA Spec. |
|---|---|---|---|
| DONS | 0.07–0.2 | <0.02 | 1.0 |

EXAMPLE 3

Preparation and Purification of FD and C Red 2

Diazotization

A 10 liter glass reactor was charged with 7.5 liters of tap water and 965 g. of sodium 4amino-1-naphthalene sulfonate (76%, 3 moles). The mixture was stirred until the sulfonate dissolved, and the solution was then treated with 30 g. of NORIT ® FQA brand of decolorizing charcoal and the resulting slurry filtered. The filtrate was acidified with 911 g. of 20° Bé hydrochloric acid, and the resulting slurry was cooled with ice to 5°–10° C. and diazotized by the dropwise addition of 500 ml. of an aqueous solution of 209 g. (3.03 moles) of sodium nitrite over a one and one quarter hour period, while maintaining the temperature and pH throughout the addition at <10° C. and 1, respectively. When all the nitrite had been added, the diazonium salt slurry was stirred at 0°–10° C. and pH 1 for three hours, and the presence of excess nitrous acid was verified periodically by testing with starch/potassium iodide paper, additional sodium nitrite being added to maintain a positive test.

Coupling Reaction

A 20 liter glass reactor was charged with 6.3 liters of tap water, 1328 g. of disodium 2naphthol-3,6-disulfonate (81%, 3.09 moles) and 569 g. (5.37 moles) of sodium carbonate. The mixture was stirred until the sodium carbonate and the disulfonate salt had dissolved, and the diazonium salt slurry from the previous step was added to the solution over a ninety minute period, while maintaining the temperature and the pH at 18°–25° C. and 8–10, respectively, and while testing frequently for excess diazo compound with alkaline H-Acid in order to insure a continuous negative test with respect to the diazo compound. The solution was then treated with 7 g. of NORIT ® FQA brand of activated charcoal and 35 g. of DICALITE ® brand of diatomaceous earth and then heated to 55° C. for two and a half hours. The slurry was then filtered, cooled to room temperature and the filtrate subjected to diafiltration as described above using a cellulose acetate membrane having a nominal pore diameter of 11 Angstroms until the conductance of the concentrate and the permeate levelled off at 11,000 micromhos and 650 micromhos, respectively. The concentrate was then further concentrated to about 3.75 gallons by ultrafiltration. A 500 ml. aliquot of this concentrate was spray dried to give 67 g. of FD and C Red 2 (Amaranth) powder, corresponding to a total pure color recovery of 1772 g. or 98% of theory. This material, on assay, had the following specifications, the specifications required by EEC regulations being included for purposes of comparison.

| | Found | EEC Spec. |
|---|---|---|
| Pure Color | 91.0 | 85 |
| NaCl, Na2SO4 | 1.04 | 5 |
| Volatiles | 7.04 | 10 |

| | Found | EEC Spec. |
|---|---|---|
| Subsidiary Colors | 0.9 | 3 |

EXAMPLE 4

Preparation and Purification of Carmoisine by the Method of the Invention

Diazotization

A 10 liter glass reactor was charged with 5.5 liters of water and 772 g. (76%, 2.24 moles) of sodium 4-amino-1-naphthalene sulfonate, and the mixture was stirred until the sulfonate dissolved. The resulting solution was treated with 30 g. of NORIT ® FQA brand of activated charcoal, the slurry was filtered, and the filtrate was acidified with 878 g. of 20° Bé hydrochloric acid. The resulting slurry was then cooled to 5°–10° C. and diazotized by the dropwise addition of 500 ml. of an aqueous solution of 156 g. (2.26 moles) of sodium nitrite over a one and one quarter hour period, while maintaining the temperature and pH of the reaction mixture at 10° C. and 1, respectively. When all the nitrite solution had been added, the resulting slurry was stirred at 0°–10° C. and pH of about 1 for three hours while testing periodically with starch/potassium iodide paper to insure a slight excess of nitrous acid at all times.

Coupling Reaction

A 20 liter glass reactor was charged with 5.5 liters of water and 425 g. of sodium carbonate, the solution was stirred until the carbonate dissolved, and then 630 g. (91.7%, 2.35 moles) of sodium 1-naphthol-4-sulfonic acid was added with stirring until all material had dissolved. The solution was then cooled to 5° C., and the previously prepared solution of the diazonium salt was then added over a period of approximately one hour while maintaining the temperature and pH at 5°–6° C. and 9–11, respectively.

The pH of the resulting solution was adjusted to 6–7 and subjected to diafiltration through a cellulose acetate membrane having a nominal pore diameter of 11 Angstroms at 200–400 p.s.i.g. and 2–3 gallons per minute. The diafiltration was continued until the concentrate and the permeate conductivities had leveled off at 5,000–10,000 micromhos and <1,000 micromhos, respectively, and the concentrate was then further concentrated to a total volume of about 4 gallons. A 500 ml. aliquot of this concentrate was spray dried to give 41 g. of pure dye, corresponding to a total recovery of 98% of theory. The material, on assay, had the following specifications, the specifications required by regulations of the E.E.C. being provided for purposes of comparison.

| | Found | EEC Spec. |
|---|---|---|
| Pure Color | 89.0 | 85 |
| NaCl | 0.07 | N/A |
| Na2SO4 | 2.26 | N/A |
| Volatiles | 1.64 | N/A |
| Subsidiary Colors | <1.0 | 1.0 |
| Unreacted Intermediates | <0.5 | 0.5 |

EXAMPLE 5

Purification of D and C Yellow 10 by the Method of the Invention

To a 22 liter glass reactor charged with 16 liters of distilled water was added 803 g. of Quinoline Yellow WS (approximately 60% pure dye), and the solution was stirred until the solid had dissolved. The solution was then treated with 288 g. of DARCO ® S-51 brand of activated charcoal and 100 g. of DICALITE ® brand of diatomaceous earth, and the resulting mixture was heated to 80°–90° C. for two hours and then filtered. The filtrate was cooled to 30°–40° C. and then subjected to diafiltration through a Zero PA polyamide membrane having a nominal pore diameter of 7–10 Angstroms until the conductance of the permeate and the concentrate levelled off at 200–500 micromhos and 5,000–7,000 micromhos, respectively. The concentrate was then further concentrated to 3.5 gallons and a 1 gallon aliquot thereof was spray dried to give 103 g. of purified material, corresponding to 75% total recovery. The purified sample thus obtained, on assay, gave the following specifications, the corresponding specifications of the crude material prior to ultrafiltration and the specifications required by FDA regulations being provided for purposes of comparison.

|  | Found | | FDA Spec. |
|---|---|---|---|
|  | Crude | Purified |  |
| Pure Color | 60 | 89 | 85 |
| NaCl | 12 | 0.1 |  |
| Na$_2$SO$_4$ | 20 | 4.0 | 15 |
| Volatiles | 8.0 | 6.1 |  |
| Yellow 11 | 108 ppm | <0.1 ppm | 4 ppm |
| Chlorinated Yellow 11 | 1190 ppm | <0.1 ppm | 2 ppm |

We claim:

1. In a process for the purification of a dye selected from the group consisting of the disodium salt of 1-[(6-methoxy-4-sulfo-3-methylphenyl)azo]-2-naphthol-6-sulfonic acid, the disodium salt of 1-[(4-sulfophenyl)azo]-2-naphthol-6-sulfonic acid, the trisodium salt of 1-[1-(4-sulfonaphthyl)azo]-2-naphthol-3,6-disulfonic acid, the disodium salt of 2-[1-(4-sulfonaphthyl)azo]-1-naphthol-4-sulfonic acid and the sodium salt of 2-(2-quinolyl)-1,3-indanedione-sulfonic acid as the products resulting, respectively, from the diazotization of 5-methoxy-2-methylsulfanilic acid in water with sodium nitrite in the presence of hydrochloric acid followed by the coupling under alkaline conditions of the resulting 5-methoxy-4-sulfo-2-methylphenyldiazonium chloride with sodium 2-naphthol-6-sulfonate; the diazotization of sulfanilic acid in water with sodium nitrite in the presence of hydrochloric acid followed by the coupling under alkaline conditions of the resulting 4-sulfophenyldiazonium chloride with sodium 2-naphthol-6-sulfonate; the diazotization of 4-aminonaphthalene-1-sulfonic acid in water with sodium nitrite in the presence of hydrochloric acid followed by the coupling under alkaline conditions of the resulting 1-sulfonaphthyl-4-diazonium chloride with disodium 2-naphthol-3,6-disulfonate; the diazotization of 4-aminonaphthalene-1-sulfonic acid in water with sodium nitrite in the presence of hydrochloric acid followed by the coupling under alkaline conditions of the resulting 1-sulfonaphthyl-4-diazonium chloride with sodium 1-naphthol-4-sulfonate; and the condensation of 2-quinaldine with phthalic anhydride followed by sulfonation of the resulting 2-(2-quinolyl)-1,3-indanedione, said dye being present in the resulting reaction mixtures, along with impurities, the improvement which comprises: subjecting an aqueous solution of the reaction mixture resulting from said coupling or said sulfonation to ultrafiltration through a membrane having a nominal pore diameter of 5–15 Angstroms under a hydrostatic pressure of approximately 200 to 400 p.s.i.g., at a pH from approximately 6.0 to 9.0, to thereby cause separation of said impurities from said dye, said impurities of a molecular size smaller than the nominal pore diameter passing into the permeate on the downstream side of said membrane and said dye remaining in the concentrate, and when substantially all said impurities have been removed from said concentrate, as evidenced by their essential absence in said permeate, recovering said dye, in approximately 90% purity from said concentrate by evaporation of said concentrate to dryness.

2. A process according to claim 1 wherein said membrane is composed of cellulose acetate, polyamide or polyvinylfluoride.

3. A process according to claim 2 wherein the concentration of the dye in said concentrate is maintained at approximately 5–25% (w/w) by recycling the concentrate and adding water thereto.

4. A process according to claim 2 wherein ultrafiltration is carried out until the concentration of the azo dye in the concentrate is maintained at approximately 5% (w/w).

5. A process according to claim 3 wherein the pH of the reaction mixture is adjusted to 6.0 to 8.0 before ultrafiltration.

6. A process according to claim 4 wherein the pH of the reaction mixture is adjusted to 6.0 to 8.0 before ultrafiltration.

7. A process according to claim 5 wherein ultrafiltration is interrupted, and the product isolated, when the conductance of the permeate is approximately 1,000 micromhos.

8. A process according to claim 6 wherein ultrafiltration is interrupted, and the product isolated, when the conductance of the permeate is approximately 1,000 micromhos.

9. A process according to claim 7 wherein the product is isolated by spray drying of the concentrate.

10. A process according to claim 7 wherein the product is isolated by pan drying of the concentrate.

11. A process according to claim 8 wherein the product is isolated by spray drying of the concentrate.

12. A process according to claim 8 wherein the product is isolated by pan drying of the concentrate.

13. A process according to claim 1 wherein said dye is the disodium salt of 1-[(6-methoxy-4-sulfo-3-methylphenyl)azo]-2-naphthol-6-sulfonic acid.

14. A process according to claim 1 wherein said dye is the disodium salt of 1-[(4-sulfophenyl)azo]-2-naphthol-6-sulfonic acid.

15. A process according to claim 1 wherein said dye is the trisodium salt of 1-[1-(4-sulfonaphthyl)azo]-2-naphthol-3,6-disulfonic acid.

16. A process according to claim 1 wherein said dye is the disodium salt of 2-[1-(4-sulfonaphthyl)azo]-1-naphthol-4-sulfonic acid.

17. A process according to claim 1 wherein said dye is the sodium salt of 2-(2-quinolyl)-1,3-indanedione-sulfonic acid.

* * * * *